(12) United States Patent
Goodzeit et al.

(10) Patent No.: US 6,921,042 B1
(45) Date of Patent: Jul. 26, 2005

(54) CONCENTRIC TILTED DOUBLE-HELIX DIPOLES AND HIGHER-ORDER MULTIPOLE MAGNETS

(76) Inventors: Carl L. Goodzeit, 1409 Yardley Pl., DeSoto, TX (US) 75115; Rainer B. Meinke, 405 Riverside Dr., Melbourne Beach, FL (US) 32951; Millicent Ball, 1415 Country Ridge Dr., DeSoto, TX (US) 75115

( * ) Notice: Subject to any disclaimer, the term of this patent is extended or adjusted under 35 U.S.C. 154(b) by 345 days.

(21) Appl. No.: 10/067,487

(22) Filed: Feb. 5, 2002

Related U.S. Application Data
(60) Provisional application No. 60/324,415, filed on Sep. 24, 2001.

(51) Int. Cl.[7] .......................... H01F 41/06; B21C 47/14
(52) U.S. Cl. ................ 242/430; 242/440.1; 242/444.2; 242/444.4; 335/213; 335/214; 336/188
(58) Field of Search ................................ 242/430, 439, 242/440, 440.1, 443, 444.1, 444.2, 444.3, 444.4, 445; 335/210, 213, 214, 299; 336/188, 189

(56) References Cited

U.S. PATENT DOCUMENTS

| | | | |
|---|---|---|---|
| 3,449,657 A | 6/1969 | Fredriksson | 324/6 |
| 3,582,766 A | 6/1971 | Iizuka | 324/6 |
| 3,584,293 A | 6/1971 | Iizuka | 324/5 |
| 3,940,772 A | 2/1976 | Ben-dov | 343/853 |
| 4,114,161 A | 9/1978 | Shibano | 343/741 |
| 4,331,896 A | 5/1982 | Sedgewick | 310/179 |
| 4,489,276 A | 12/1984 | Yu | 324/338 |
| 4,808,959 A * | 2/1989 | Weissman | 336/189 |
| 4,814,731 A * | 3/1989 | Sato et al. | 335/216 |
| 5,450,093 A | 9/1995 | Kim | 343/895 |
| 5,748,063 A | 5/1998 | Crow | 335/299 |
| 5,995,586 A | 11/1999 | Jahnke | 378/137 |

* cited by examiner

*Primary Examiner*—Ramon M. Barrera
(74) *Attorney, Agent, or Firm*—Brian S. Steinberger; Law Offices of Brian S. Steinberger, P.A.

(57) ABSTRACT

Concentric tilted double-helix magnets, which embody a simplified design and construction method for production of magnets with very pure field content, are disclosed. The disclosed embodiment of the concentric tilted double-helix dipole magnet has the field quality required for use in accelerator beam steering applications, i.e., higher-order multipoles are reduced to a negligibly small level. Magnets with higher multipole fields can be obtained by using a simple modification of the coil winding procedure. The double-helix coil design is well-suited for winding with superconducting cable or cable-in-conduit conductors and thus is useful for applications that require fields in excess of 2 T. The coil configuration has significant advantages over conventional racetrack coils for accelerators, electrical machinery, and magneto-hydrodynamic thrusting devices.

18 Claims, 12 Drawing Sheets

CONCENTRIC TILTED DOUBLE-HELIX DIPOLES AND HIGHER-ORDER MULTIPOLE MAGNETS

This invention relates to dipole and higher multipole magnets, and in particular to concentric tilted double-helix dipole magnets, for applications in particle beam steering, magneto-hydrodynamic thrusting, and stators and rotors in electrical machinery, and this invention would be particularly important for applications that require use of superconductors, but could also be used with normal conductors, and this invention claims the benefit of priority to U.S. Provisional Application 60,324,415 filed Sep. 24, 2001.

BACKGROUND AND PRIOR ART

It is well known that dipole magnets can be used for particle beam steering in charged particle accelerators, beam lines, and storage rings. Dipole magnets have also been used in magneto-hydrodynamic thrusting devices, for applications such as propulsion of sea going vessels or fluid pumping, and for magneto-hydrodynamic power generation. Additional applications for these magnets have included electrical machinery such as motors and generators. These applications have benefited by the use of superconducting magnets whose higher magnetic fields enhance the performance and can substantially reduce the size, and consequently, the cost, of such equipment.

Conventional superconducting dipole magnets used for these applications employ racetrack shaped coils to produce magnetic fields in the range of 3–10 T. Such coils are usually made with a flat Rutherford style superconducting stranded cable or flat ribbon conductor in order to provide a high current density in a small volume. The geometry of such flat-cable coils dictates that they be wound starting from the inside (or smallest radius) turn to the outermost turn to form a saddle-shaped coil half. Two such halves are mounted opposite to each other to form the dipole magnet. This method of making saddle-shaped racetrack coils (which we will refer to as the "conventional" coil) has at least six drawbacks.

First, for accelerator applications, which need a high field strength but very uniform dipole field (one with a very low content of higher-order multipoles), a complex cross-section for the coil is required. Since the field uniformity in such high-field superconducting magnets is almost completely defined by the conductor placement, the conventional design requires an approximation to a cosine θ current distribution in the coil because such a distribution reduces the higher-order multipole fields. The precise conductor positioning to control the field multipole content in such coils is obtained by the inclusion of expensive precision spacers in the coil straight sections plus complex and expensive special pieces at the ends of the racetrack shaped coils. Fields in excess of about 4 T require more than one coil layer, and thus, the complexity of the design is carried into the successive layers.

Second, the conventional coils are almost exclusively wound with flat Rutherford-type cable. This is done in order to get as many turns as possible of high current carrying capacity conductor around the coil aperture and thus maximize the field that can be obtained with a given amount of superconducting material. However, such cable has the drawback of being relatively expensive to produce and suffers current-carrying degradation of the superconductor as the result of mechanical deformation to produce the flattened cable.

Third, the conventional design requires tight bends for the ends of the inner turns of the coil. When such magnets are made from Rutherford-type cable (flat cable), they require complex coil ends because the large aspect ratio of the cable (a width to thickness ratio that is often of the order of 10) makes it difficult to bend the cable around the ends of the coil. Typically, the flat side of the cable is positioned to follow a computer-generated three-dimensional space curve, often called a "constant perimeter bend", in order to minimize the distortion in the cable. Precise coil end parts are fitted between the coil turns in the end in order to maintain this geometry. The small bend radius and unavoidable conductor distortion in this design makes it difficult to use A 15 superconductors or HTS materials that are needed for fields greater than ~10 T because these materials are brittle and their current-carrying capacity is strain dependent.

The fourth drawback is that these conventional coils are difficult and expensive to manufacture and require dedicated expensive tooling to make each of the layers that comprise the dipole magnet. Special winding mandrels are needed for each size coil and "curing presses" are needed to complete the coil construction.

The fifth drawback is that the conventional coils require the application of a high azimuthal pre-stress to the coil in order to eliminate the tendency of the coil to pull away from the pole when the magnet is energized and thus cause a premature quench or training of the magnet. The application and monitoring of such pre-stress is complicated and expensive. The level of the pre-stress employed depends on the intensity of the field and such pre-stress becomes excessively high as the design field approaches 10 T. Thus, the conventional racetrack-shaped coils are not generally used for such high field applications.

The sixth drawback is that the saddle-shaped coils used in conventional magnet designs suffer from an effect called "field enhancement", where the maximum field seen by the superconductor in the coil is greater than the central field in the dipole. This peak field usually occurs at the pole turn of the innermost coil and is often enhanced further by the tight bend radius of the inner turn as it goes around the coil end. This enhancement is typically of the order of 5%. The result is that the performance of the superconductor is degraded, and more superconductor is required to achieve the same performance that would be attained if there were no peak field effect.

The first drawback applies primarily to accelerator magnets that require a high quality (very uniform) field. The other disadvantages (other five drawbacks) of the conventional racetrack designs (such as the need for high azimuthal pre-stress, tight bend radii, field enhancement degradation of the superconductor performance, and complex manufacturing with dedicated tooling) apply to all applications of such magnets.

Additional requirements for higher field magnets (10 T and above) are indicated as follows: When applied to magnets that employ high field superconducting materials that are brittle in nature (such as $Nb_3Sn$, other A-15 compounds, and HTS materials), the level of pre-stress required could damage the conductor. Furthermore, the high forces necessary to compress the coils azimuthally are difficult to apply and retain, and require expensive dedicated equipment. As a consequence, most magnets designed for accelerator use at such high fields employ a block or flat (not saddle shaped) racetrack coil design also using the flat, Rutherford style cable. However this approach suffers from at least three drawbacks.

First, the coil shape attainable in the block coil type design does not produce a very precise approximation to the ideal current distribution necessary for a very low multipole content field. Thus, field trimming methods are needed to achieve the required field uniformity for accelerator applications.

Second, block coil or flat pancake coils require dedicated tooling to wind and form each coil. In the block coil design for a single aperture magnet, the ends of each racetrack coil have to be bent out of the plane of the magnet aperture to allow room for the particle beam tube. The flat coil design spanning two apertures eliminates this drawback; however, it is useful only for twin aperture magnets with one beam aperture above the other.

Third, the minimum bend radius is limited by the allowable bending strain that can be imposed on the brittle conductor. In the block or flat coil design, the innermost turns necessarily have a small bending radius. This may require that the flat racetrack shaped coils made with A-15 or other brittle materials be wound with un-reacted cable, reacted in place, and then vacuum impregnated with epoxy. Such a procedure is complicated and expensive.

U.S. Pat. No. 5,374,913 to Pissantezky describes superconducting dipole magnets for particle accelerators, having a twin bore flux pipe dipole magnet. This patent provides an informative description, "Background of the Invention" of the state of the art of the development of superconducting accelerator magnets using the racetrack-shaped coil referred to as the cosine-θ coil design, and also discusses the drawbacks of the conventional racetrack coil. Pissantezky's magnet is composed of coils in the form of pipes, one inside the other, in which the dipole field is generated in the space between the pipes. Two magnet bores are inserted in this space such that the fields in each are in opposite directions so as to form a twin bore magnet that could be used in a dual ring accelerator. This coil design does not embody the principles or method of generation of the magnetic field used by the tilted double-helix magnet described herein.

U.S. Pat. No. 6,002,316 to McIntryre describes a complex type of stress management for a superconducting coil in a superconducting accelerator magnet, and indicates the problems associated with the coil structural integrity in high field dipoles. This patent describes a technique to counteract the Lorentz forces in a block coil magnet design. It should be noted here that the double-helix coil design of the subject invention provides a relatively simple method of stress management that can allow it to go to high fields without significant deflection in the coil due to the Lorentz forces.

The subject invention double-helix design is an improvement that can be applied to magneto-hydrodynamic devices for applications such as ship propulsion, fluid pumps, and power generators. Such devices depend on a strong dipole field for operation.

In the current state of the art, conventional racetrack coils are used to generate the magnetic field. For example, U.S. Pat. No. 4,301,384 to Gaines describes a method of the support of the end turns in a superconducting dipole magnet used for magneto-hydrodynamic generation of electrical power, and uses elongated, saddle-shaped superconducting magnet rings that comprise a conventional racetrack dipole coil design. U.S. Pat. No. 5,284,106 to Meng describes a superconducting magneto-hydrodynamic seawater pump to launch torpedoes, and shows racetrack coils as the method of producing the dipole field required to activate the device.

The use of superconducting windings in electrical machinery (such as induction motors and generators) can provide a high output device in a small size compared to conventional machines. Superconducting windings can generate magnetic fields typically 2–5 times stronger than those which can be obtained with normal resistive windings. Since the energy density rises with the square of the magnetic field, such devices can be considered to be 4–25 times more powerful per unit volume of field than normal types of machines. U.S. Pat. No. 5,672,921 to Herd describes the use of epoxy impregnated superconducting coils of a racetrack shape in the rotating armature for a rotary generator. U.S. Pat. No. 5,777,420 to Gambel shows a superconducting induction motor rotor composed of racetrack shaped coils wound with a high temperature superconducting (HTS) material in tape form.

None of the patent references provide solutions to all the drawbacks of conventional prior art systems described above.

SUMMARY OF THE INVENTION

A primary objective of the invention is to provide an easy, and thus less costly, method to manufacture dipole magnets suitable for accelerators and other dipole applications mentioned. The tilted double-helix coil configuration effectively eliminates numerous and expensive parts that are used to provide precise conductor positioning in the construction of the coils of conventional superconducting accelerator magnets such as conventional racetrack and block coil dipole magnets.

A secondary objective of the invention is to provide a dipole magnet configuration that eliminates the need for applying a high level of azimuthal pre-stress that is required for racetrack, saddle shaped or current shell approaches to dipole magnet design. The invention configuration simplifies the necessary technology, and thus eliminates the equipment and design complications associated with that activity.

A third objective of the invention is to provide a method of manufacturing a dipole magnet that eliminates the need for special end parts normally used in racetrack accelerator coils. Since a coil layer of a double-helix magnet is made by a continuous helical wind with the same sized loop, the method of manufacture is greatly simplified, and the geometry of the ends of the double-helix magnets is the same as in the body of the magnet.

A fourth objective of the invention is to provide a dipole magnet that can be wound from a variety of superconductor configurations. Conventional coils require the use of flat Rutherford-type cable in order to obtain a high packing factor. The novel double-helix magnets can use a round multi-strand cable of high current-carrying capacity, which is less costly to manufacture than the Rutherford-style cable and has less degradation of the superconductor. The coils also permit the use of a variety of conductor sizes and shapes, such as cable in conduit conductor, to make the magnet configuration useful for larger scale (i.e. larger magnetic volume) applications.

A fifth objective of the invention is to provide a dipole magnet that can be fabricated without using expensive specialized tooling. The tilted helix geometry allows the coils to be fabricated with standard machine tools and thus eliminates the need for dedicated expensive tooling such as that necessary to wind and form the coils for the racetrack or block coil designs. Thus, models and prototypes can be made with minimum tooling investment.

A sixth objective of the invention is to provide dipole magnets with high field quality suitable for use in particle accelerators. The double-helix magnets can be configured so that the higher-order multipole content is virtually zero, and thus, special corrector magnets are not needed.

A seventh objective of the invention is to provide dipole magnets that enable the use of inherently brittle high field superconducting materials to obtain high magnetic fields, even in smaller sized magnets. The tilted helix coil geometry produces a coil turn with a relatively large minimum bend radius that is several times larger than that for conventional racetrack coils.

An eighth objective of the invention is to provide dipole magnets having an excellent structural stability to resist the action of Lorentz force, which can be rather large in the case of high field magnets. The tilted helix coil design enables a straightforward approach to the stress management since the coils can be reinforced much like a high field solenoid.

A ninth objective is to provide higher order multipole magnets, such as quadrupoles and sextupoles, by using a conductor path modification with the winding technique that is used for the double-helix dipole magnets. The higher-order multipole magnets are obtained from the basic concentric coil concept by using conductor paths for which the helical advance is modulated with sinusoidal functions that vary as $\sin n\theta$; for example n=2 produces a quadrupole field and n=3 produces a sextupole field.

This invention discloses a dipole magnet that consists of concentric pairs of oppositely tilted helically wound coils connected in such a way that the solenoid field in each pair is canceled and the dipole fields add. These double-helix coils can have applications such as for a superconducting beam steering dipole magnet in particle beam accelerators and storage rings, an MHD (magneto hydrodynamic) propulsion magnet for seagoing vessels, a superconducting motor stator, and the rotor for an induction motor.

Further objects and advantages of this invention will be apparent from the following detailed description of a presently preferred embodiment that is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Dipole Magnet-Double Helix Magnets

Figure 1:
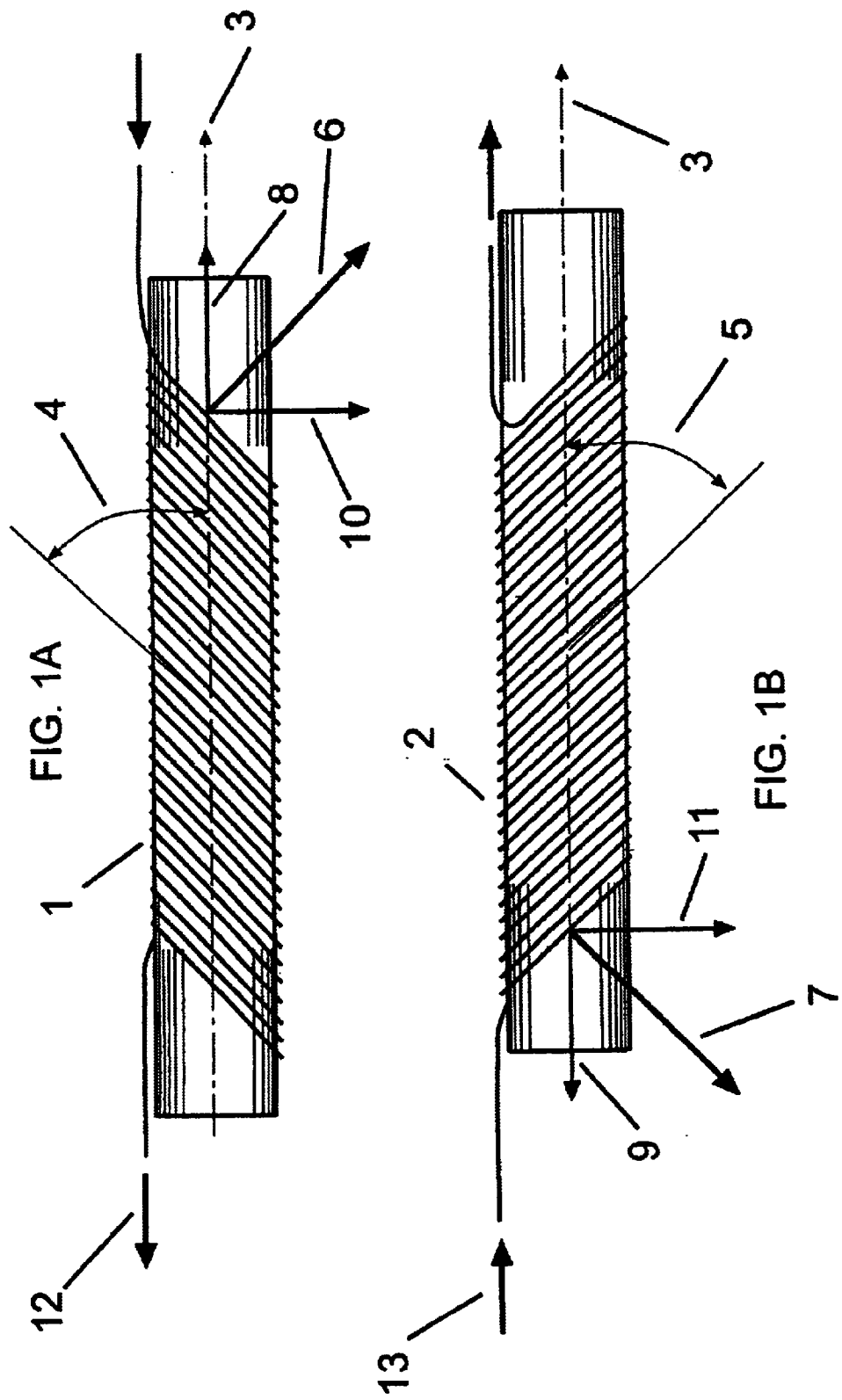
FIG. 1A shows a separate helically wound right tilted coil about a core.
FIG. 1B shows a separate helically wound left tilted coil about a core.

FIG. 1A shows a separate helically wound right tilted coil 1 about a core 60 with lead end 12 on the left side. FIG. 1B shows a helically wound left tilted coil 2 about a core 60 with lead end 13 on the left side. Core 60 can be a coil form, a support tube, and the like. Referring to FIGS. 1A–1B, the coils 1, 2 are wound in a counter-clockwise direction when looking from the lead end and the windings are tilted at an angle 4, 5 with respect to the central z-axis 3, of the coils.

Referring to FIGS. 1A, 1B, the coil windings 1, 2 are tilted opposite to each other and the current will flow in opposite directions in the two coils. Arrow 12 refers to the direction of current in coil 1, and arrow 13 refers to the direction of current in coil 2. In this case, each coil produces total field vectors 6, 7 in the directions shown, which are generally perpendicular to the tilted planes of the coils. The total field can be resolved into components in the z-direction 3 and perpendicular to the z-direction. The z-direction components are along the axis of the coils and are the solenoid components 8, 9. The components perpendicular to these are the dipole components 10 and 11. It is seen that the solenoid components 8 and 9 act in opposite directions, while the dipole components 10 and 11 act in the same direction.

Figure 2:
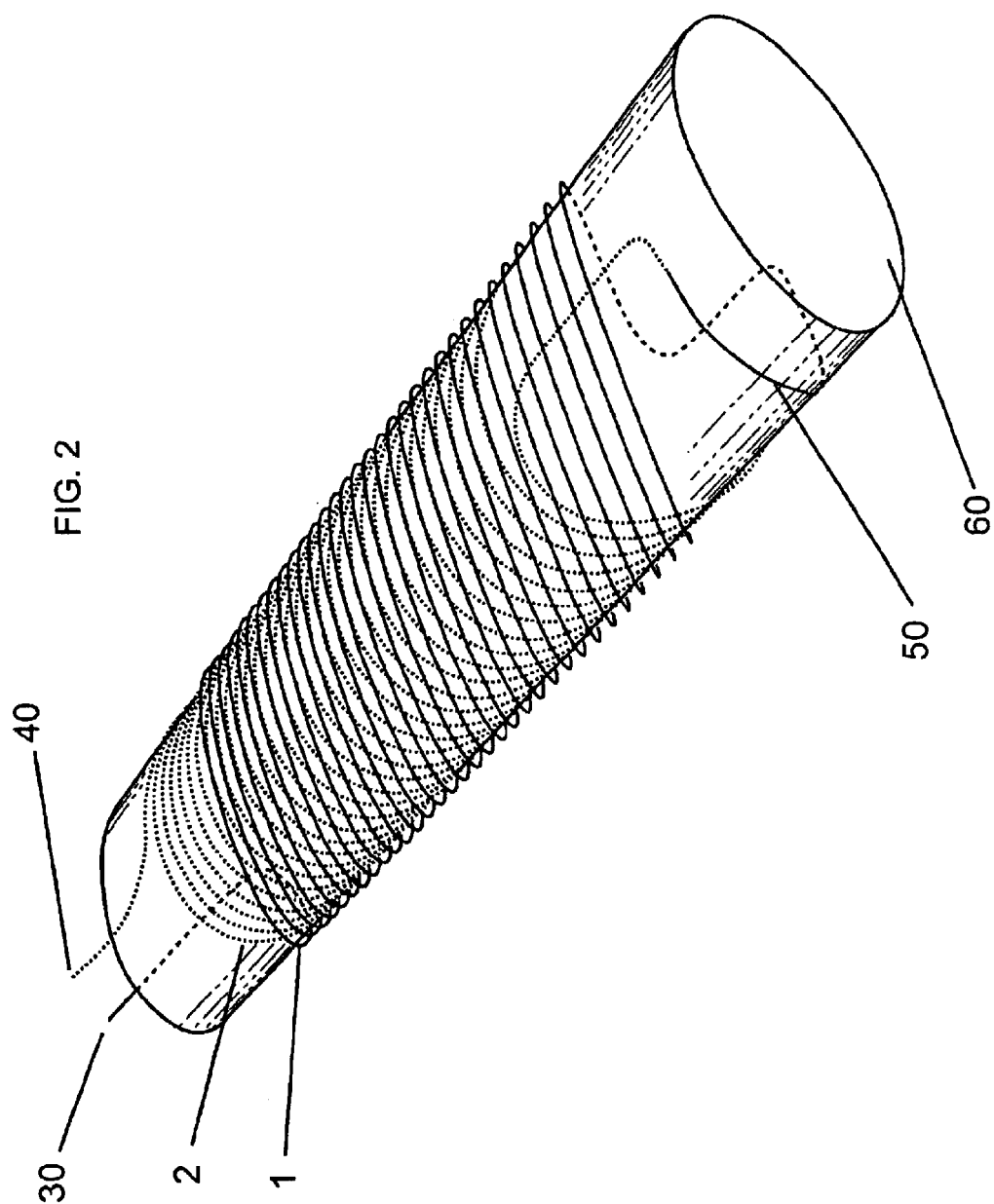
FIG. 2 shows the two tilted helix coils of FIGS. 1A–1B combined on the same core.

FIG. 2 shows the two counter-clockwise tilted helix coils 1, 2 of FIGS. 1A–1B combined on the same core. When the two coils are combined, one inside the other, and connected as shown in FIG. 2, the result is a magnet in which the solenoid fields cancel and the dipole fields add. This combined configuration is a preferred embodiment of the double-helix dipole.

Referring to FIG. 2, two counter-clockwise tilted helix coils 1 and 2 are combined to form a dipole with a continuous current flow, as shown. Other configurations of the concentric pair are also possible since either counter-clockwise or clockwise wound coils, the current direction and magnitude in each coil, and the tilt angles can be chosen in a way to cancel the solenoid field and add the dipole fields. The inner and outer coils 1, 2 can be connected as shown 50 so that the current leads 30 and 40 are at one end of the magnet, called the lead end. However, the current leads 30, 40 can be at opposite ends with other coil configurations that can be chosen. Also, with separate current leads to each coil, the magnitude of the tilt angle and the current need not be the same in each coil, as long as the solenoid field components cancel; however, in practice, they would probably be the same in both coils of a pair for reasons of symmetry and practical operation.

For FIG. 2, an elliptical shape is selected for the core 60 such as a coil form, support tube, and the like. The core 60 shape can be chosen for the particular application. For example, a circular core shape is one that can produce error free fields. Elliptical cores allow for a larger minimum conductor bend radius than can be obtained with a circular coil, and other shapes (such as square, rectangular) can be used for specific applications. Elliptical cores with certain ratios of width to height can also produce error free fields.

The principle of the double-helix configuration, including effects of the tilt angle and conductor size, can be demonstrated by using a model for a circular aperture coil that consists of a series of discrete current loops that are tilted at an angle a with respect to the horizontal plane. This simplified approach neglects the end effects and considers the coils to be infinite in length. In addition, it does not include the effect of iron or iron saturation in the computation of the magnetic field.

Figure 3:
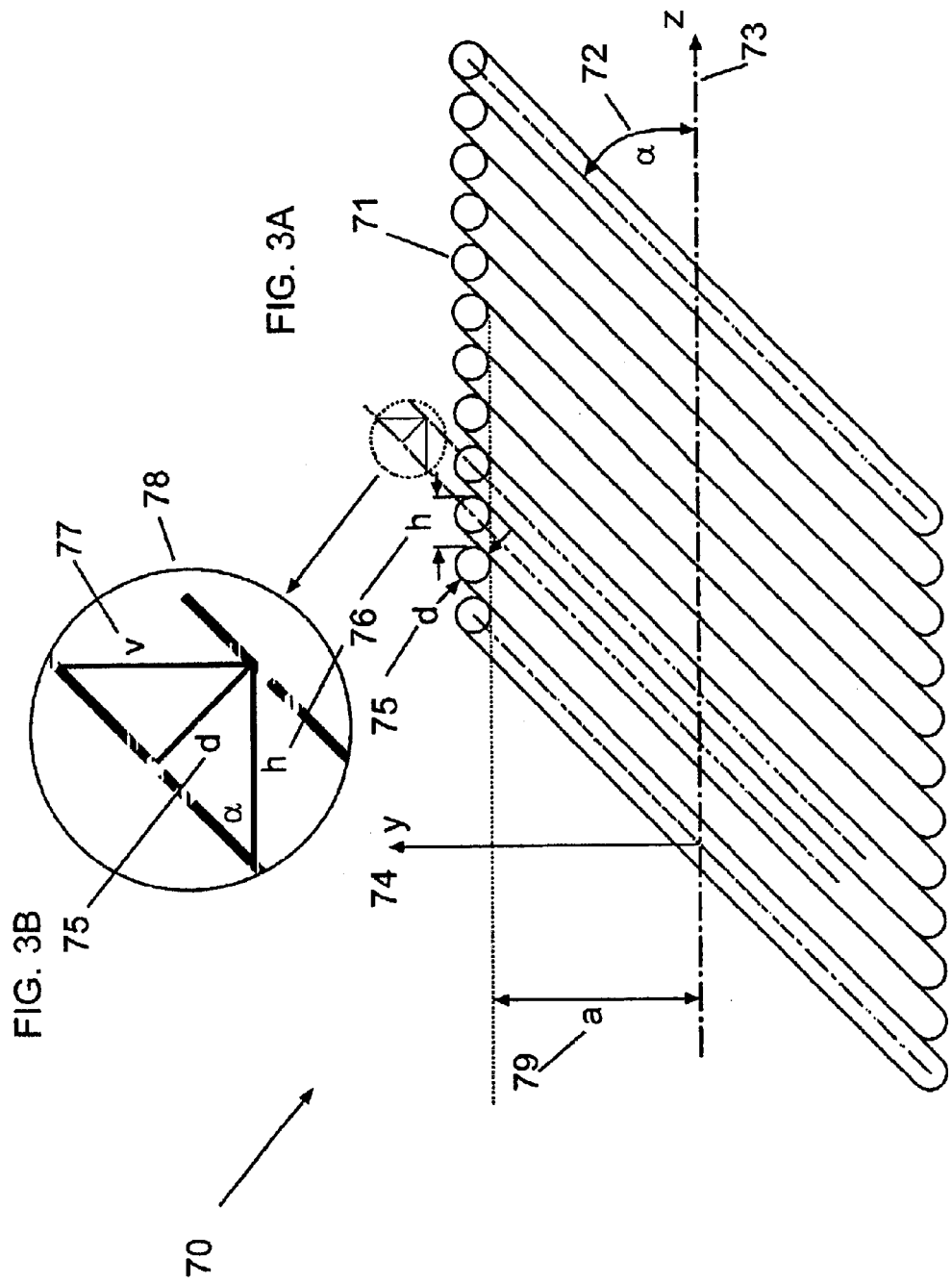
FIG. 3A shows a series of tilted current loops.
FIG. 3B is an enlarged view of the conductor spacing of FIG. 3A.

The strength of the dipole and solenoid field obtained in each of the tilted helical coils in the concentric pair is related to the width of the conductor and the tilt angle of the conductor path. The relationship between the field, tilt angle, and conductor width are determined as follows:

FIG. 3A shows a series of tilted current loops 70 and FIG. 3B is an enlarged view 78 of the conductor spacing in FIG. 3A. In FIG. 3A each tilted current loop 71 is at a tilt angle $\alpha$ 72 with respect to the z-direction axis 73. When the loops of a tilted helix coil are wound next to each other as shown, the minimum turn spacing in the z-direction (horizontal), h, 76 has to be greater than the conductor width, d, 75. It is seen that the horizontal spacing, h, depends on the tilt angle, $\alpha$, and is given by $$h = \frac{d}{\sin\alpha}.$$

Thus the maximum number of turns/m in the z-direction is $n_z = 1/h$ and the maximum solenoid field that can be obtained with a conductor of diameter d and tilt angle $\alpha$ is $$B_z = \frac{\mu_0 I_0 \sin\alpha}{d},$$

where $I_0$ is the current in each loop.

Similarly, it can be shown that the dipole field depends on the turn spacing in the y-direction (vertical), which is shown in FIGS. 3A–3B as v, 77, where $$v = \frac{d}{\cos\alpha}.$$

It is known that the field strength of a vertical dipole field (y-direction) in a circular aperture of radius, a, that is produced by a current distribution perpendicular to the aperture and varying as the azimuthal angle around the aperture is given by $$B_y = \frac{\mu_0 I_T}{2a}$$

where $I_T$ is the total current flowing through a quadrant of the coil. For our approximations, we assume that this same relationship holds for the dipole field inside the double helix with a circular aperture. (The validity of this assumption was verified by comparing results from a precise computer calculation.) We can express $I_T$ as $n_y I_0$, where $n_y$ is the number of current loops per quadrant in the y-direction and is given by the quadrant radius, a, divided by the vertical turn spacing, v. Thus the dipole field component is $$B_y = \frac{\mu_0 I_0}{2d} \cos\alpha.$$

Note that the dipole and solenoid field strength of each coil is independent of the coil radius, a 79. Thus, when two coils are superimposed as shown in FIG. 2, the current flows oppositely in each layer and the solenoid field in the pair is canceled. The opposite tilt angle of each layer causes the dipole fields to add, and thus, the combined dipole field of a pair of coils is $$B_y = \frac{\mu_0 I_0}{d} \cos\alpha.$$

(In practice, $I_0$, d, and $\alpha$ are generally identical for both coils; however, it is the magnitude of the resulting solenoid field that must be the same in both coils, so different combinations of those parameters could be used in each coil if there was a need.)

Figure 16:
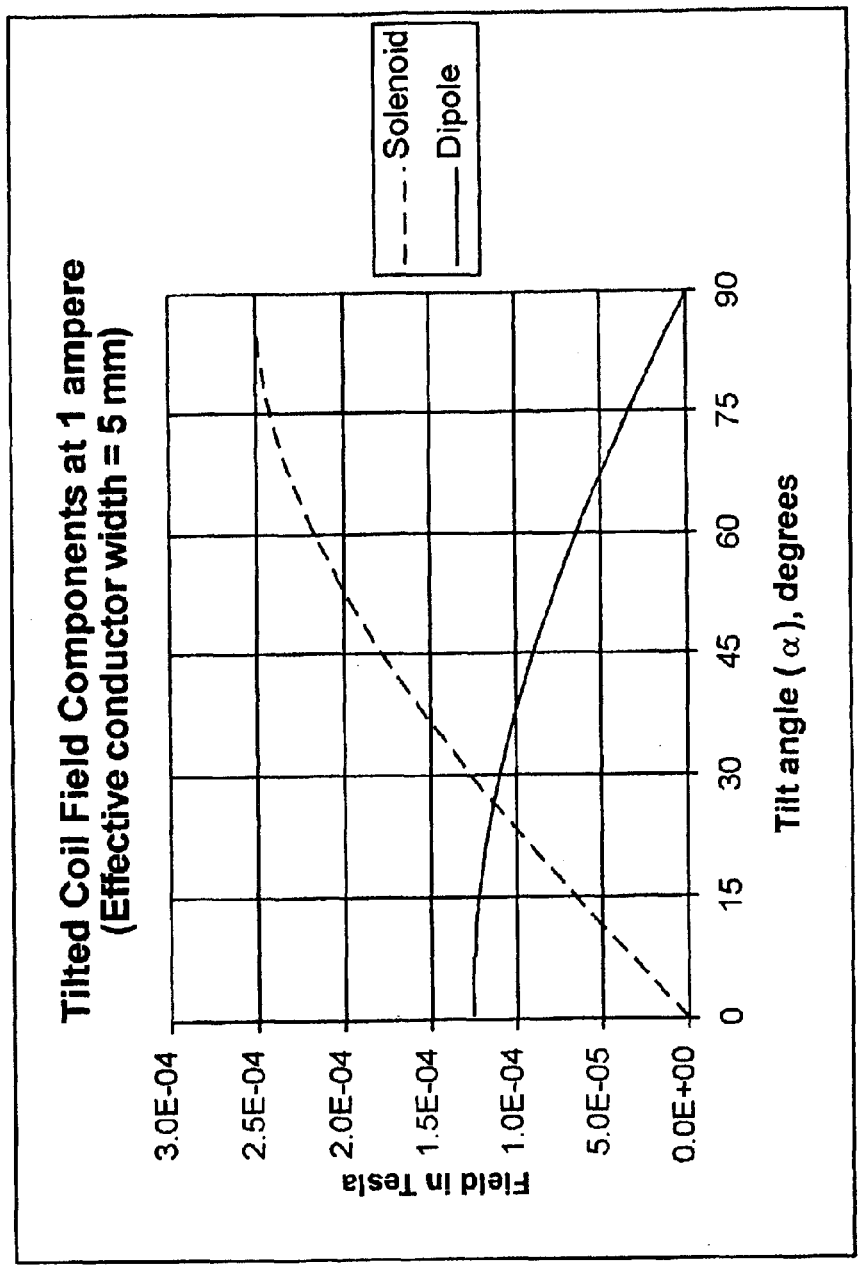
FIG. 16 shows a plot of solenoid and dipole field strength as a function of tilt angle.

The graph in FIG. 16 shows the variation of the strength of the solenoid and dipole field components as a function of the tilt angle with respect to the axis of the coil. These values apply for a current of 1 ampere flowing in a coil with a conductor of 5 mm width, and the simplified case of no iron and no end effects. It is seen that tilt angles from 15 to 45 degrees produce a strong dipole component in relation to the solenoid field component and thus most of the applications would use coils in this tilt range. The dipole and solenoid fields both have the same dependence on the current (a factor in the numerator) and the conductor size (a factor in the denominator). Thus the angular dependence of the relative strengths of the 2 fields that is shown in FIG. 16 will be the same for any choice of current and conductor size.

Obtaining Error Free Fields

Dipole magnet configurations that have been developed for superconducting accelerator use have employed a method of coil design that is based on obtaining a current distribution about the aperture of the coil such that the axial current varies as the cosine of the angle from the horizontal plane. Theoretically such a cosine θ current distribution about a circular aperture produces a pure dipole field without any error fields, i.e., there are no higher-order multipole components. However, physical limitations do not permit the racetrack coil design to achieve an exact cosine θ current distribution, and thus, approximations are used in such coils. This is usually done with cylindrical coil shells that have wedges or spacers between the conductor turns, and there are always unwanted multipoles superimposed on the dipole fields produced by such coils.

Unlike the conventional coils, the windings of the double-helix coil follow 3-dimensional space curves that allow the current to pass over the pole and change direction with respect to the axial direction of the coil. This effectively produces a current component in the axial direction that diminishes with azimuthal angle and vanishes at the pole much like a cosine θ current distribution. Calculations have shown that error free fields can be obtained in certain double helix magnets, i.e., they behave the same as perfect cosine θ current distributions. Two configurations that yield error-free dipole fields are a circular aperture coil and an elliptical aperture coil in which the conductor path in the tilted plane is circular.

Such cases have been analyzed using a computer program called CoilCad™ that works in the following way. The descriptive geometry of the 3-dimensional space curve of the coil winding is created for a tilted helical wound coil. CoilCad™ then numerically integrates the Biot-Savart Law along the path of the conductor to obtain the total field in the aperture of the coil. The field is then decomposed into horizontal (solenoid) and vertical (dipole) components. Fourier analysis is then used to determine the amplitude of the harmonics of the vertical field component.

Figure 4:
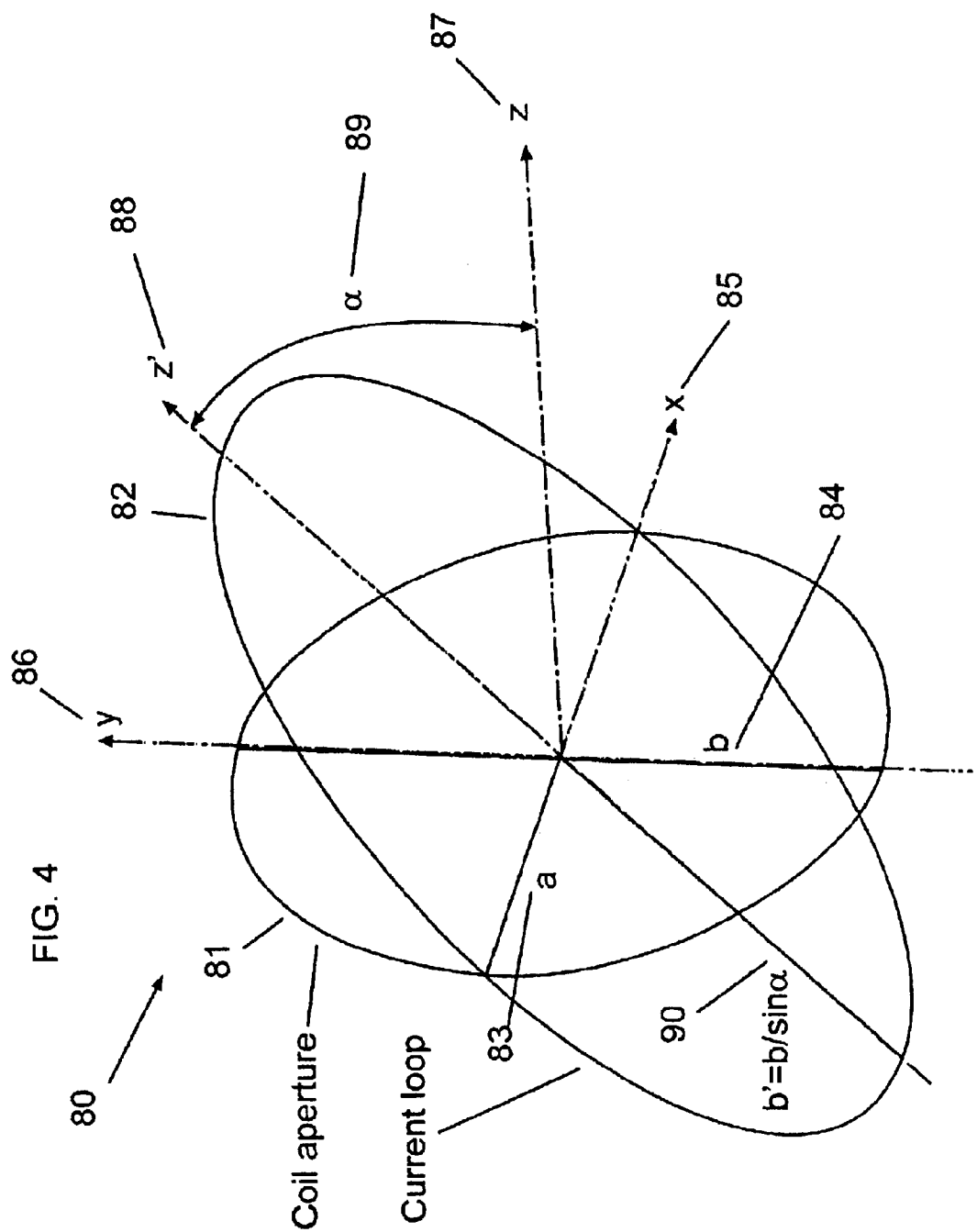
FIG. 4 shows the cross sections of an elliptical aperture cylinder, and one tilted current loop.

FIG. 4 shows the cross section of the aperture cylinder, 81, and one tilted current loop, 82. In this case the model is simplified by considering the turn as a closed loop; the effect of the advance per turn of the conductor path will be added in later. For generality, the coil aperture, 81, has an elliptical cross section with half-width a, 83, and half-height b, 84, and lies in a plane defined by the x-axis, 85, and y-axis, 86. The central axis of the coil is labeled as z, 87, and the central axis for the tilted ellipse, 82, is labeled as z', 88. The tilted ellipse is at an angle $\alpha$, 89, from the horizontal plane. The half-height of the tilted ellipse (along the z'-axis) is b'=b/sin $\alpha$, 90.

Figure 5:
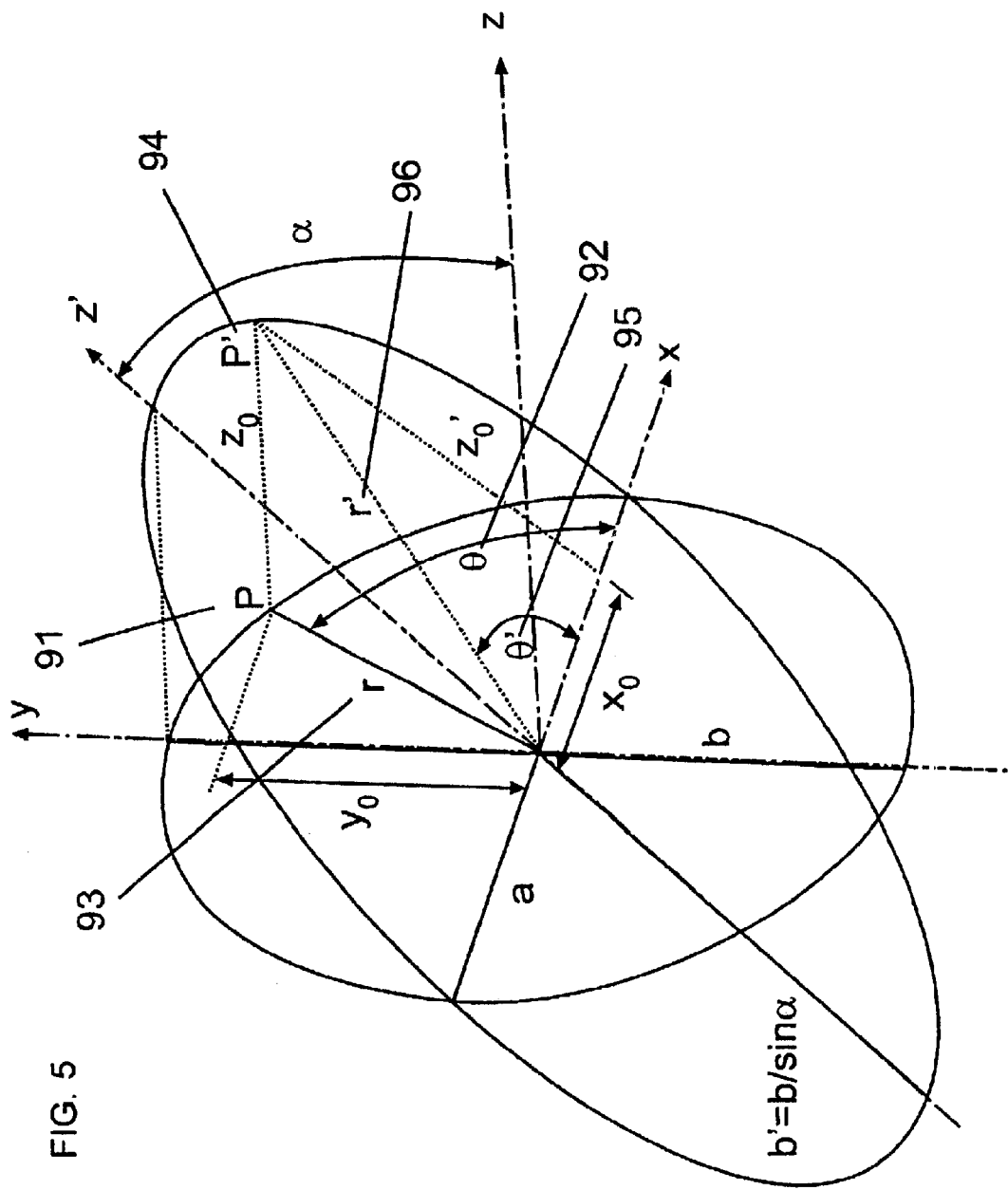
FIG. 5 shows a general point $P(x_0,y_0,0)$, on the coil aperture at an angle $\theta$, with respect to the x-axis and at radial distance r, and its projection point $P'(x_0,y_0,z_0)$ on the plane of a tilted current loop.

FIG. 5 shows a general point $P(x_0,y_0,0)$, 91, on the coil aperture at an angle $\theta$, 92, with respect to the x-axis and at radial distance r, 93. It has a projection $P'(x_0,y_0,z_0)$, 94, on the tilted loop at the corresponding angle $\theta'$, 95, and radius, r', 96. The coordinates of the point $P'(x_0,y_0,z_0)$ on the tilted plane, in terms of the parameters of the aperture, are $x_0$=r cos $\theta$
$y_0$=r sin $\theta$
$z_0=y_0/\tan \alpha = r \sin \theta/\tan \alpha$ Defining $$e \equiv \frac{a}{b},$$

the ratio of the horizontal to the vertical semi-axes of the coil aperture ellipse, and using the polar coordinate equation for an ellipse, the general expression for the radial coordinate is $$r = \frac{a}{\sqrt{e^2\sin^2\theta + \cos^2\theta}}.$$

Case 1, Circular Aperture Coil

The specific case of a coil with a circular aperture in the x-y plane is obtained with the dimensions of the aperture being b=a; hence e=1, r=a, and the coordinates of the conductor path, including the advance of the helix with angle, c$\theta$, are:

x=a cos $\theta$
y=a sin $\theta$ $$z = c\theta + \frac{a\sin\theta}{\tan\alpha}$$

When this is the case, the CoilCad™ calculations show that systematic field errors of double-helix dipoles are on the level of $10^{-8}$ or less relative to the main dipole field.

Case 2. Elliptical Aperture Coil

Numerical calculations by CoilCad™ show that field errors on the level of $10^{-8}$ or less relative to the main dipole field also occur for an elliptical aperture double-helix dipole coil when the tilted ellipse of the conductor path, 82, is a circle. That is the case when the aperture dimensions are such that a=b'=b/sin $\alpha$. Thus $$e \equiv \frac{a}{b} = \frac{1}{\sin\alpha}$$

and the descriptive geometry for such a coil is x=r cos $\theta$
y=r sin $\theta$ $$z = c\theta + \frac{r\sin\theta}{\tan\alpha}$$

where $$r = \frac{a\sin\alpha}{\sqrt{\sin^2\theta + \sin^2\alpha\cos^2\theta}}$$

Thus, for each tilt angle $\alpha$, there is an optimal ellipse geometry that will give a circular conductor path in the tilted plane and thus produce an error free dipole field.

In summary, it has been shown with numerical calculations using the precise 3 dimensional winding pattern of double-helix dipoles that all higher-order field multipoles essentially vanish in each individual tilted coil for the 2 cases discussed above. A small, skew dipole component caused by the helical solenoid windings is canceled by the superposition of two coils having opposite tilt angles and current directions. Thus, the double-helix doubles are capable of producing a pure dipole field without any higher-order multipoles.

Double-helix Magnet with Higher Multipoles

It has been shown above that for a circular aperture coil, a pure/dipole field is obtained when the z-coordinate, $z_0$, has the form $$z = c\theta + \frac{a\sin\theta}{\tan\alpha} = c\theta + A\sin\theta$$

where the factor A can be considered as the amplitude of the sine function of the conductor path in the tilted turn. This expression can be generalized by including a factor, n, that can be applied to the frequency of the sine function, so that the z-coordinate of the tilted turn can be described as $z=c\theta+A \sin n\theta$.

The case for n=1 describes the geometry of the tilted helix dipole and represents a sinusoidal modulation of the z-coordinate at a frequency of once per turn. Thus, the path of the tilted loop in the double-helix dipole can be considered as a sinusoidal modulation of a solenoid with amplitude, A. Similarly, if the frequency of modulation is n=2, then the z-coordinate of the conductor path is $z(\theta)=c\theta+A \sin 2\theta$. It has been determined that such a coil will produce a solenoid field in the z-direction and a field that varies as 1/r in the x-y plane. This radial dependence of field defines a quadrupole. Thus, when two such coils are combined, one inside the other, but with currents in the opposite direction, the solenoid fields cancel and the quadrupole fields add. The result is a quadrupole magnet. This concept can be extended to include higher multipole magnets; for instance, sextupoles and octupoles can be produced by using a frequency of the modulation function of n=3 and n=4 respectively.

Minimum Bend Radius of the Conductor

An important consideration in the design of a superconducting coil is the minimum bend radius of the conductor ($R_{min}$). This is especially important for smaller aperture magnets that are typically used in accelerators. The conventional cylindrical shell racetrack coil requires tight bends for the ends of the inner turns of the coil. However, the problem associated with coil ends is completely avoided in the double-helix configuration design since all the turns are geometrically the same (elliptical shapes). For a general ellipse, $R_{min}=r_1^2/r_2$ where $r_1$ is the smaller and r2 is the larger semi-axis of the tilted ellipse. For the double-helix magnet with an elliptical aperture and a circular conductor path of radius a in the tilted plane, the minimum bend radius is $R_{min}=a$, the half-width of the coil aperture. For example, a double helix coil of approximately 50 mm aperture width and windings at a tilt angle of approximately 45° should have an aperture height of approximately 35.35 mm and thus would have a minimum bend radius of approximately 25 mm for the innermost coil layer. For a circular aperture coil of approximately 50 mm diameter and approximately 45° winding tilt angle, the minimum bend radius would be $R_{min}=a \sin \alpha=$approximately 17.68 mm. In comparison, the approximately 50 mm aperture SSC dipole has a minimum bend radius of approximately 7 mm at the end of the first turn of the innermost coil.

Conductor Configurations

Various conductor configurations can be used with double-helix magnets and other devices that employ this coil configuration. This versatility is due to the simple geometry of the coils and the ability to configure the coils with a minimum bend radius of the conductor that is compatible with the permissible amount of mechanical deformation for the particular conductor cross section. Examples of conductor types that are easily adaptable for use in double helix-magnets are shown in FIGS. 10–14.

Figure 10:
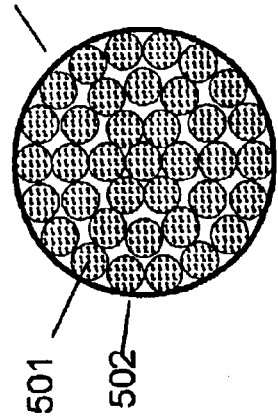
FIG. 10 shows a cross-sectional view of a round multi-strand cable that can be used with the double-helix coil configuration.

FIG. 10 shows a cross-sectional view of a round multi-strand cable 500 that can be used with the double-helix coil configuration. Small sized magnets, such as those used for accelerator dipoles, can produce high fields with the use of a round multi-strand cable which consists of round strands, 501, with superconducting filaments embedded in a conducting matrix, typically copper. The example in FIG. 10 shows a 37-strand cable that is wrapped with an insulating layer, 502, which is typically Kapton.

Figure 11:
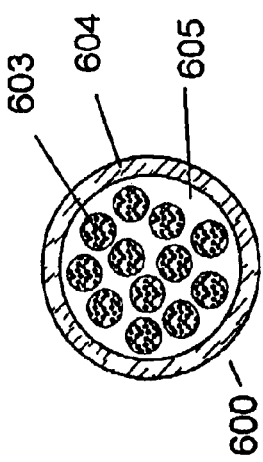
FIG. 11 shows a round cable-in conduit conductor that can be used with the double-helix coil configuration.

FIG. 11 shows a round cable-in conduit conductor 600 that can be used with the double-helix coil configuration. The use of the tilted double-helix dipole coils in electrical machinery and in magneto-hydrodynamic thrusting devices enables the use of conductor configurations that have special advantages for such applications. In particular, the use of cable-in-conduit conductor 600 for such applications can reduce the complexity and cost to produce the cryogenic environment necessary to keep the superconducting coils at their operating temperature. A round cable-in-conduit conductor such as that shown in FIG. 11 typically has round multi-filamentary superconducting strands, 603, inside a tube, 604, that can contain cryogenic coolant 605. This method of conductor cooling eliminates the need for a helium containment vessel.

Figure 12:
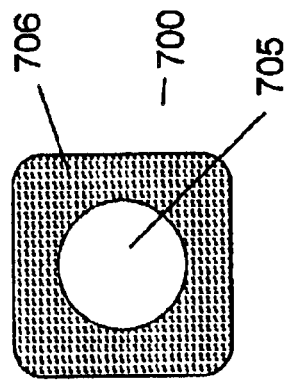
FIG. 12 shows a cable-in-conduit conductor with superconducting filaments embedded in a conducting matrix that can be used with the double-helix coil configuration.

FIG. 12 shows a square/rectangular cable-in-conduit tubular conductor 700 that can be used with the double-helix coil configuration. This conductor is made of a low resistivity material (such as copper or aluminum) that contains embedded superconducting filaments, 706; the interior of the cross-section, 705, forms a tube that is used for the cryogen flow.

Figure 13:
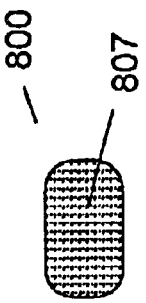
FIG. 13 shows a solid conductor that can be used with the double-helix coil configuration.

FIG. 13 shows a solid conductor 800 that can be used with the double-helix coil configuration. Such conductors can be made with solid superconducting cross-sections, with superconducting filaments 807 embedded in a low resistivity matrix.

Figure 14:
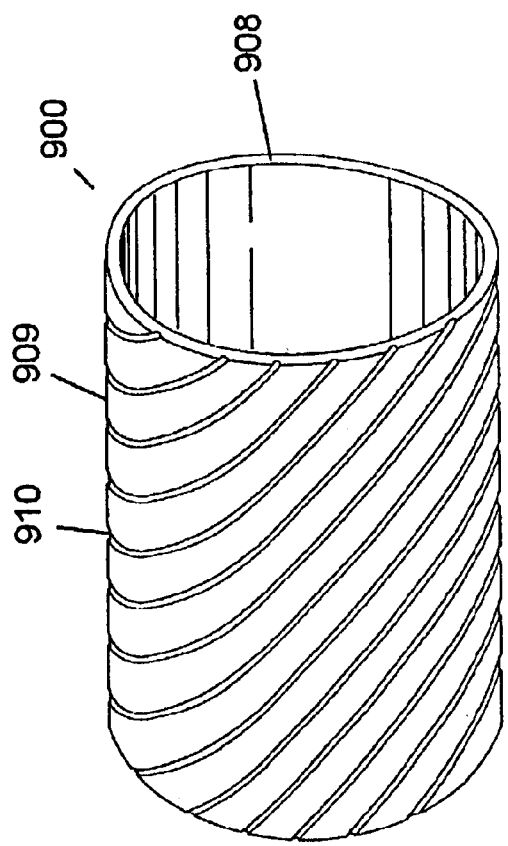
FIG. 14 shows a novel core having helically cut grooves for use with the double-helix coil configuration.

FIG. 14 shows a novel core 900 having helically cut grooves for use with the double-helix coil configuration. This type of conductor configuration that can be advantageously used in double helix-magnets is based on the concept of applying a thin conducting layer to a cylindrical tube and then machining or otherwise removing strips of the conductive material to form tilted helical current paths. This method uses a coil form, 908, upon which a conducting film or layer, 909, can be deposited or otherwise attached. Spiral grooves, 910, are then cut into the surface to remove conducting material and form the tilted helical current path.

Applications of the Double-helix Dipoles

Accelerator Magnet Applications

Figure 6:
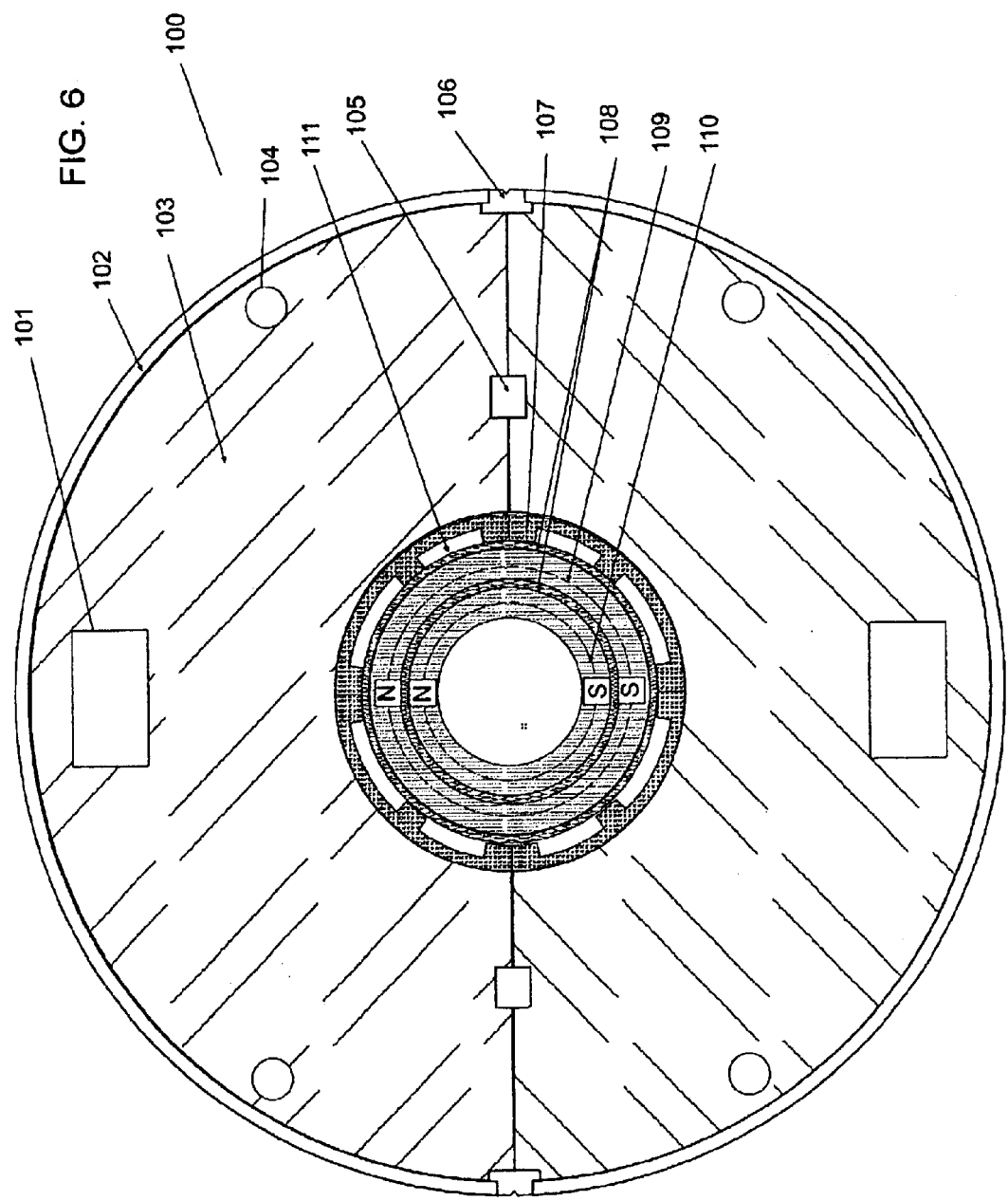
FIG. 6 is a cross-sectional view of the embodiment of the double-helix coils of the preceding figures in a superconducting accelerator dipole magnet.

FIG. 6 is a cross-sectional view 100 of double-helix coils of the preceding figures assembled in a superconducting accelerator dipole magnet. In FIG. 6, two pairs of double-helix coils are shown in a superconducting accelerator dipole magnet that is used to bend a particle beam in a circular path in the magnet aperture. In this example the aperture of the inner coil is approximately 50 mm and the coils are wound with a circular stranded superconducting cable that is selected for appropriate current carrying capacity and operating margin for the design field of the magnet. Two such double-helix coils wound with niobium-titanium superconductor can produce a central field of approximately 6 to approximately 7 T. Higher fields can be obtained by using more layers of double-helix coils and/or superconducting materials that can operate at higher fields (such as niobium-tin, other A-15 compounds, or high temperature superconductors).

The cross section in FIG. 6 is referred to as the cold mass of the magnet since it is to be maintained at approximately 4.5 K for use with the example superconductor. In the complete magnet assembly, the cold mass would be placed in a low heat leak cryostat to maintain the appropriate operating temperature. This figure shows an accelerator magnet construction with double-helix coils. A helium containment shell, 102, surrounds the iron yoke, 103, of the magnet. The shell acts as a pressure vessel to contain the cryogen, which may be super-critical helium under pressure or pool boiling liquid helium near atmospheric pressure. The inner coil pair, 110, and the outer coil pair, 109, are shown oriented with the North Pole on top to produce a dipole field from top to bottom; the field direction may be reversed if desired by changing the direction of the current in the coil.

Figure 15:
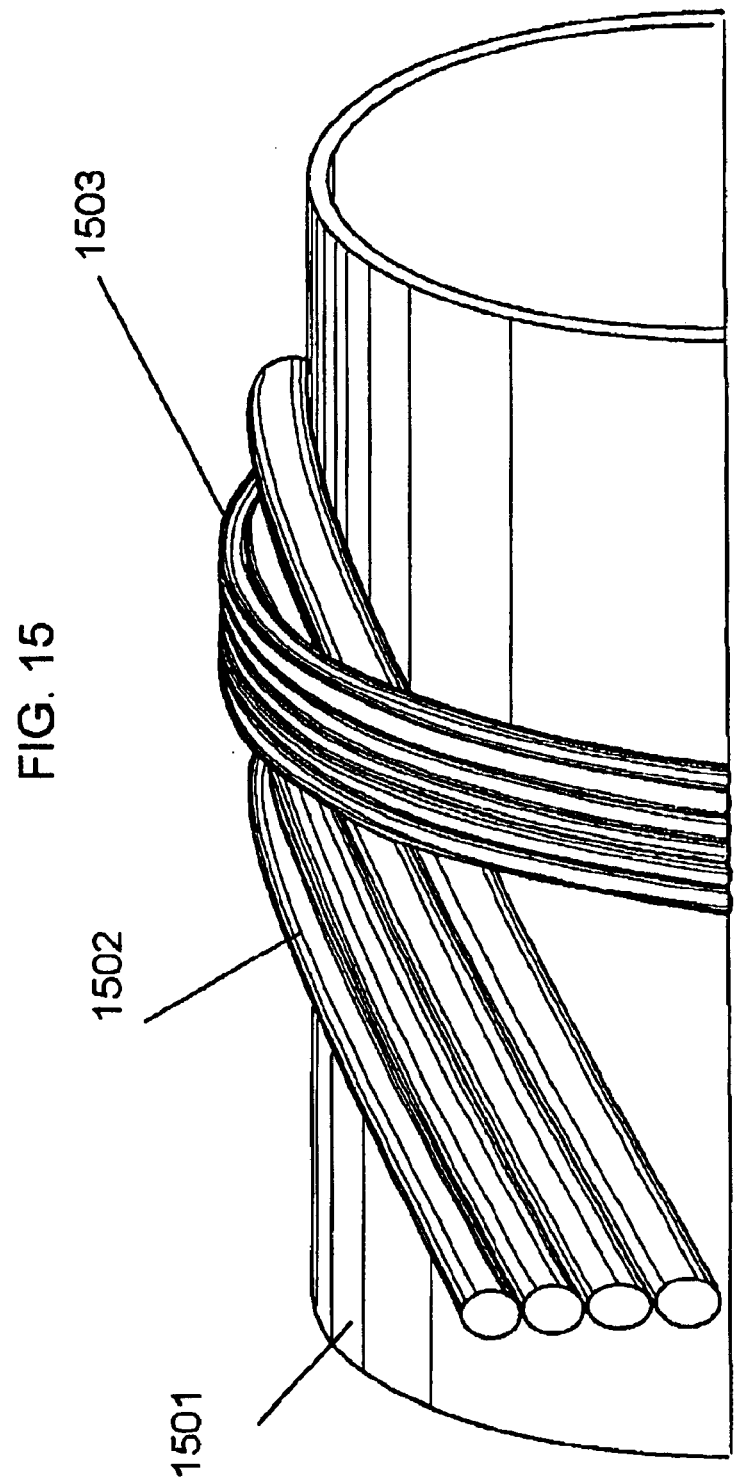
FIG. 15 shows a portion of a single layer coil and a portion of reinforcing wrap.

The inner double-helix coil 110 is subject to large Lorentz forces, which could cause movement of the conductor and thus cause the coil to quench prior to obtaining its maximum field. It is therefore common practice to reinforce or preload accelerator magnet coils to prevent such motions. A known method of counteracting the Lorentz forces in solenoid magnets that is also applicable to the double-helix dipoles is the use of an external wrap of a high tensile strength wire (such as stainless steel, bronze, or aluminum) over the coil. A high strength stranded material such as fiberglass or Kevlar™ can also be used for this purpose. This method is illustrated in FIG. 15 that shows a portion of a tilted-helical coil 1502 mounted on a coil form or magnet core 1501. A portion of an over wrap of wire under tension 1503 produces a compressive force on the coil and this force counteracts the Lorentz force on the coil. Thus both the inner and outer double-helix coils 109,110 of the accelerator magnet in FIG. 6 can be reinforced and pre-loaded by the relatively simple method of employing overwraps of stainless steel wire under tension, 108, as shown in this example. The coils 109, 110 are therefore self supporting against the action of the Lorentz forces and no additional loading or clamping forces need to be applied to the coils. Since no external clamping pressure is required, a non-structural insulating spacer can be used, such as that shown, 107. The spacer can include flow passages, 111, so that the cryogen can completely surround the coils to maintain them at their operating temperature. Such spacers can be typically made from an injection molded reinforced plastic resin and are thus relatively inexpensive to manufacture.

Other features that can be included in the cold mass are a registration key, 105, to align the upper and lower halves of the yoke, 103, and pins, 104, that are used to assemble stacks of yoke laminations. Space for passing the electrical bus work for the magnet is also included in the yoke, 101. Typically the helium containment shell, 102, is made in two pieces and the two halves are welded together with a welding strip, 106, as shown, to form the vessel.

An accelerated beam of charged particles at a fixed energy can be maintained in a circular orbit for a prolonged time by using dipole magnets to curve the beam path at the required radius. This type of accelerator is sometimes called a "storage ring" and is included as an application for accelerator magnets using double-helix dipoles.

"Particle beam steering" is the general term for the use of dipole magnets to curve the path of a charged particle beam so that it can be directed to conform to a specified path location i.e. in accelerators, storage rings, or other devices that require the placement of a particle beam along a given path. Thus particle beam steering is included as an application for accelerator magnets using double-helix dipoles.

Quadrupole and higher multipole magnets are also used in accelerator applications. For example, quadrupoles are used for beam focusing and higher order multipole magnets are used as corrector magnets to cancel unwanted multipoles that occur with conventional dipole magnets. Quadrupole and higher multipole magnets could be made with a cross section similar to that shown in FIG. 6, except the coils would be replaced by coils of the selected multipole(s), which would be wound using the modulated sin nθ helical advance that was discussed in the topic "Double-helix magnets with higher multipoles". Thus, beam-focusing quadrupoles and higher multipole corrector magnets are included as an application for accelerator magnets using double-helix coils.

Figure 7:
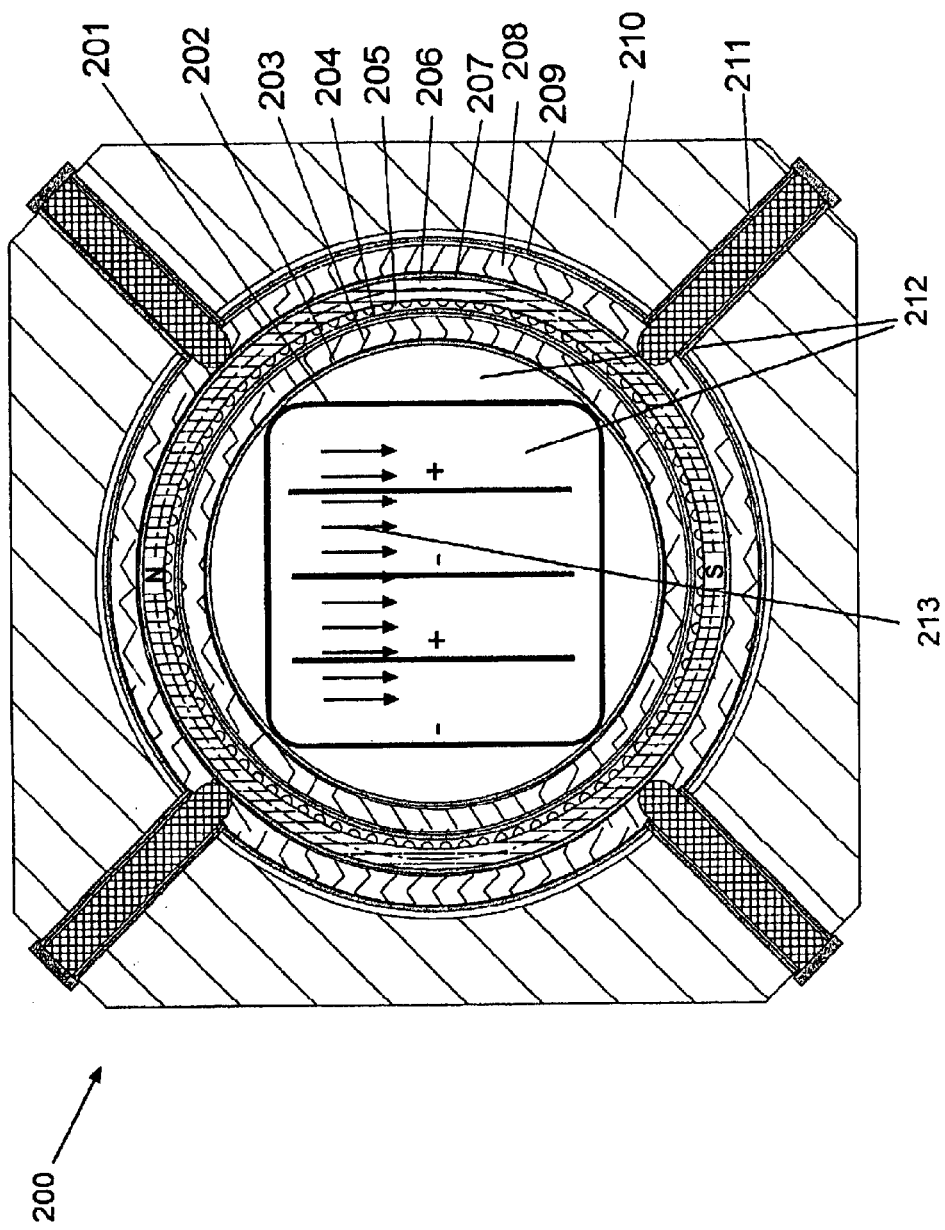
FIG. 7 is a cross-sectional view of the embodiment of the double-helix coils of the preceding figures for an MHD propulsion magnet.

Applications of the Double-helix Dipoles
Application to Magneto-hydrodynamic Thrusting Devices FIG. 7 is a cross-sectional view 200 illustrating the use of the double-helix coils of the preceding figures for an MHD (magneto-hydrodynamic) propulsion magnet. It is an example of the embodiment of a double-helix dipole for a magneto-hydrodynamic thrusting device for propulsion of a sea going vessel. Additionally, similar devices can be used for fluid pumping or power generation. A seawater channel, 212, contains an electrode array, 201, that is located in a dipole field, 213, produced by pairs of double-helix dipole magnets, 206. One pair is shown in FIG.7 but multiple pairs may be needed to provide the required field strength. The magnet coils 206 are superconducting and therefore must be maintained in a cryogenically cooled environment that is called the magnet cold mass assembly. It consists of inner and outer shells, 204 and 207, for containment of liquid or supercritical helium maintained at the prescribed operating temperature of the superconducting coils. Flow passages, 205, can be generally placed in proximity to the coils to provide channels for the flow of cryogen to efficiently cool the coils, 206.

This magnet cold mass is enclosed in a cryostat assembly in which a vacuum environment is maintained between its inner cylindrical shell, 202, and outer cylindrical shell 209. Multi-layer insulation blankets, 203 and 208, typically with liquid nitrogen cooled shields within them, fill the space between the cryostat inner shell 202 and cold mass inner shell 204 and between the cold mass outer shell 207 and cryostat outer shell 209.

The weight and inertia loads of the cold mass require support by means of a structurally adequate, low heat leak support system. In this example the support can be provided by a method similar to that used to support the cold masses in the Tevatron particle accelerator at Fermi Lab: at certain sections along the length, the cold mass assembly is supported by adjustable compressive loading cartridges, 211, having a high thermal resistance. In this example, the cold mass and cryostat can be enclosed in an iron magnetic shield or yoke, 210. The yoke can serve to enhance the magnetic field by providing a low reluctance return path for the flux and also acts as a main structural member for the support of the cold mass and cryostat.

Figure 8:
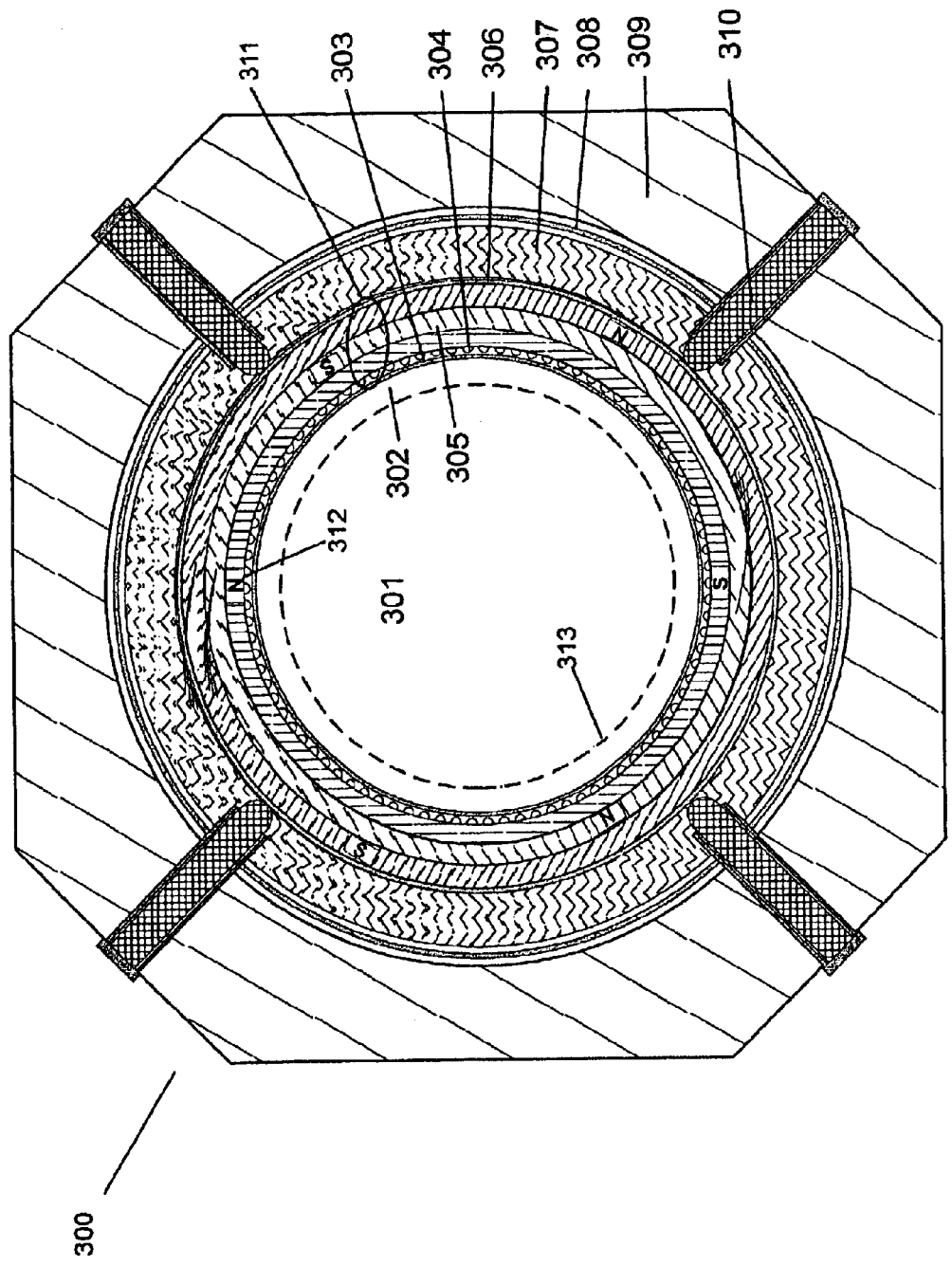
FIG. 8 is a cross-sectional view of the embodiment of the double-helix coils of the preceding figures in a superconducting motor stator.

Applications of the Double-helix Dipoles
Application as a Stator in Electrical Machinery FIG. 8 is a cross-sectional view 300 illustrating the use of the double-helix coils of the preceding figures in a superconducting motor stator. The high magnetic fields and simplified construction of the coils enable the double-helix dipole configuration coils to be used advantageously in electrical machinery such as superconducting motors and generators. An embodiment of tilted double-helix coils that can be energized to produce a rotating magnetic field suitable for a superconducting induction motor stator is illustrated in FIG. 8. The arrangement can be similar to that used for a magneto-hydrodynamic application that was shown in FIG. 7. However, in this example, 3 pairs of double-helix dipole coils, 305, are placed to form a 6-pole rotating field using 3-phase alternating current excitation. The rotating field will be produced in the interior volume, 301, of the stator. The rotating field can also be produced by a 2- or 4-pole arrangement of the tilted helix coils for use with single or two-phase AC excitation, respectively.

In the example shown in FIG. 8, 3-sets of double-helix dipole coils, 305, are spaced so that the north poles, 312, are 120° apart. With 3-phase AC this will produce a rotating field at ⅓ of the frequency of the AC excitation. These coils are enclosed between an inner helium containment shell, 303, and an outer helium containment shell, 306, to make the magnet cold mass assembly, 311. The cold mass can include helium flow passages, 304, in the proximity of the coils in order to maintain them at their required operating temperature. Thermal insulation for the cold mass can be provided by means of multi-layer insulation, 307, which can include a liquid nitrogen cooled thermal shield (not shown). The cold mass assembly, 311, and its thermal insulation, 307, can be contained in a cryostat outer shell, 308, to enclose the vacuum environment needed to maintain the thermal insulation.

In this example, the vacuum environment in the interior of the cryostat includes the interior volume, 301, of the stator assembly. An alternate configuration could have the stator volume, 301, in an ambient temperature environment by including an inner wall, 313, to the vacuum vessel. In this case, an additional multi-layer insulation and shield assembly, like that shown as 307, can be included in the space, 302, similar to the arrangement shown in FIG. 7.

Figure 9:
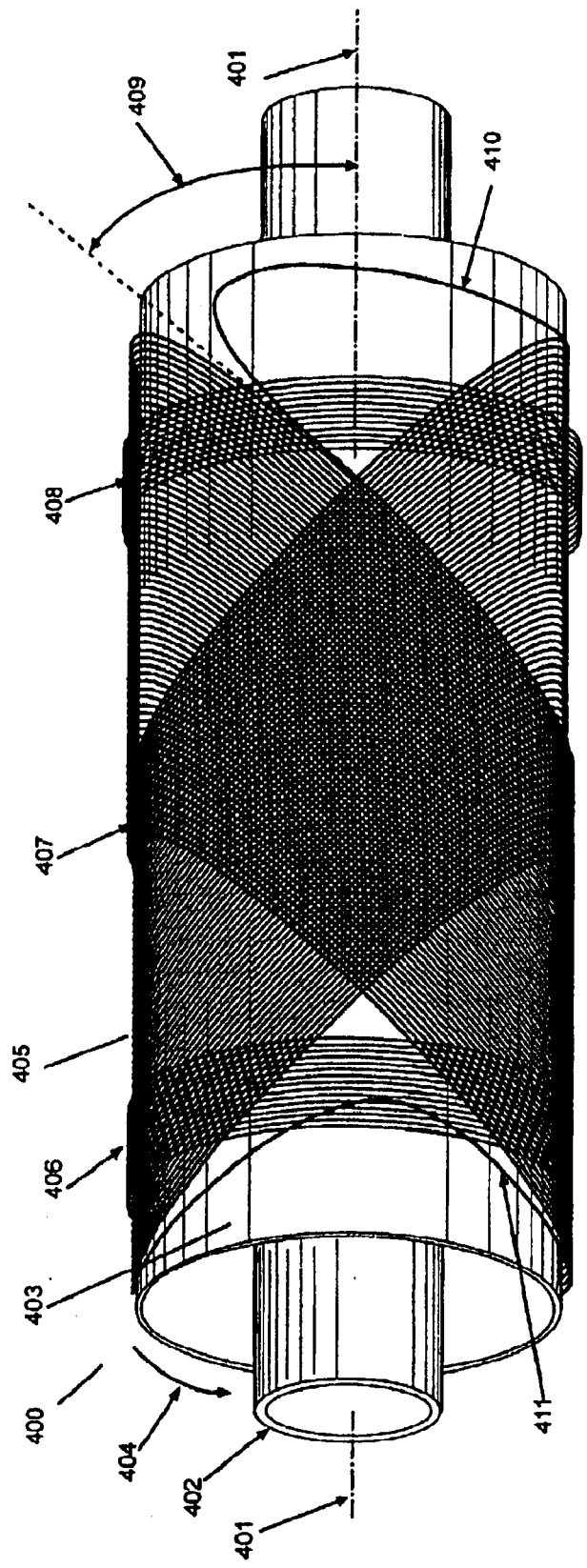
FIG. 9 shows the double-helix coils of the preceding figures being used as the rotor for an induction motor.

Applications of the Double-helix Dipoles
Application as a Rotor for an Induction Motor FIG. 9 shows the double-helix coils of the preceding figures being used as the rotor 400 for an induction motor. A double-helix dipole coil that is placed in a rotating magnetic field will experience a torque arising from the large induced current in the coil and thus will act as the rotor for an induction motor. The rotor turns about the axis, 401, in the direction, 404, when the assembly is placed in a rotating magnetic field as produced, for example, by the stator shown in FIG. 8. The rotor can consist of a shaft, 402, that transmits the motor power to an external drive. The rotor shaft, 402, can be rigidly connected to the coil support cylinder, 403, upon which the tilted double helix coils 405 and their reinforcement, 406,407,408, are mounted. In this example, a counterclockwise-wound tilted helical coil, 405, is mounted on the support cylinder, 403. The coil windings can be tilted at an angle, 409, with respect to the axis, 401. (Note that the same arrangement could also be made with two clockwise-wound coils.)

A known method of counteracting the Lorentz forces in solenoid magnets that is also applicable to the double-helix dipoles is the use of an external wrap of a high tensile strength wire, such as stainless steel, over the coil. The tension force in the wire wrap produces a compressive force on the coil and this tension can be adjusted to counteract the tensile force produced by the Lorentz forces acting on the coil. Thus, each pair of coils can have an added reinforcing over wrap, 406,407,408, to counteract the Lorentz force and also, in the case of the rotor, the centrifugal force.

The coils can be connected at the ends as shown by loops, 410 and 411, such that the current in one coil will flow in the opposite direction to that in the other coil. The result is that, when placed in the rotating magnetic field, the current induced in the two coils can create solenoid fields that cancel and dipole fields that add. The dipole field produced by the induced current in the coils counteracts the rotating dipole field of the stator and produces a torque on the rotor that is proportional to the slip between the speed of rotation of the field and the speed of rotation of the rotor. It is known that if the rotor is driven at a higher rotation speed than the rotating field of the stator then the assembly can act as a generator and thus produce power.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of forming a dipole magnet, comprising the steps of:
   winding a first layer helical coil about at least one of: a magnet core and a general coil form, wherein the coil wound on the core would have windings at the required final tilt angle, and whereas the coil wound on the general coil form would have a larger aperture and more vertical tilt angle than a final assembled configuration;
   transferring the first coil layer from the general coil form to the magnet core and inclining the windings to a selected tilt angle and final position;
   winding a second layer helical coil about the first layer or general coil form, wherein the second coil wound over the first layer coil would have windings at a required final tilt angle, whereas the coil wound on the general coil form would have a larger aperture and greater vertical tilt angle than the final assembled configuration;
   transferring the second coil layer from the general coil form to the magnet core and inclining the windings to the selected tilt angle and the final position; and
   forming electrical connections between the 2 coils so that solenoid fields produced by the 2 coils will be in opposite directions and cancel each other while dipole fields will add.

2. The method of claim 1, further including the step of:
   changing dipole strength based on the angle of the tilt of the coil windings, conductor spacing and shape of coil aperture.

3. The method of claim 1, further comprising the step of:
   producing a dipole field having systematic field errors of less than approximately $1\times10^{-6}$ of the dipole field.

4. The method of claim 1, further comprising the step of:
   producing a field of substantially high purity solely from geometry of the tilted windings of the coils without using field adjusting devices.

5. The method of claim 1, further comprising the step of:
   producing a field of approximately 10 T and above.

6. The method of claim 5, wherein the step of producing includes the step of:
   using multiple layers of concentric pairs of dipoles.

7. The method of claim 1, further comprising the step of:
   forming a high packing factor of conductor for efficient field generation without using Rutherford superconducting cables.

8. The method of claim 1, further comprising the step of:
   forming a magnet of multipole order n (where n=1 is a dipole) by modulating helical windings with a sine wave of order n, i.e. using a helical advance that is proportional to $\sin n\theta$.

9. The method of claim 1, further comprising the step of:
   forming a dipole magnet by modulating helical windings with a sine wave of order 1 to form a dipole field.

10. The method of claim 1, further comprising the step of:
    forming a quadrupole magnet by modulating helical windings with a sine wave of order 2 to form a quadrupole field.

11. The method of claim 1, further comprising the step of:
    forming a sextupole magnet by modulating helical windings with a sine wave of order 3 to form a sextupole field.

12. The method of claim 8, further including the step of:
    using the method for at least one of: beam steering and focusing elements, higher order correction magnets in accelerator beam lines and storage rings.

13. The method of claim 9, further including the step of:
    using the method for at least one of: beam steering and focusing elements, higher order correction magnets in accelerator beam lines and storage rings.

14. The method of claim 10, further including the step of:
    using the method for at least one of: beam steering and focusing elements, higher order correction magnets in accelerator beam lines and storage rings.

15. The method of claim 11, further including the step of:
    using the method for at least one of: beam steering and focusing elements, higher order correction magnets in accelerator beam lines and storage rings.

16. The method of claim 1, further comprising the step of:
    replacing racetrack shaped coils in magneto-hydrodynamic devices to improve performance and lower costs.

17. The method of claim 1, further comprising the step of:
    inserting the dipole magnet coils as stator windings of an electrical machine; and
    producing a rotating magnetic field in the aperture of the coils.

18. The method of claim 1, further comprising the step of:
    using the dipole magnet coils as the rotor of an electrical machine; and
    producing electromotive power.

\* \* \* \* \*